(12) United States Patent
Lee

(10) Patent No.: US 6,321,081 B1
(45) Date of Patent: Nov. 20, 2001

(54) METHOD FOR CONTROLLING TRANSMITTING POWER IN BASE STATION TRANSCEIVER SUBSYSTEM

(75) Inventor: Yeon-Hee Lee, Inchon-kwangyokshi (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/042,969

(22) Filed: Mar. 17, 1998

(30) Foreign Application Priority Data

Apr. 11, 1997 (KR) .................................................. 97-13382

(51) Int. Cl.[7] .................................................. H04Q 7/20
(52) U.S. Cl. .................. 455/422; 455/67.1; 455/67.3; 455/13.4; 455/38.3; 455/522; 455/574
(58) Field of Search .................... 455/8, 9, 423, 455/424, 67.1, 412, 426, 428, 434, 439, 445, 450, 452, 464, 517, 63, 67.2, 67.3, 69, 422, 425, 13.4, 14, 38.3, 500, 510, 522, 524, 561, 574, 343

(56) References Cited

U.S. PATENT DOCUMENTS

| | | | |
|---|---|---|---|
| 5,086,506 | * | 2/1992 | Hall et al. .................................. 455/8 |
| 5,386,588 | * | 1/1995 | Yasuda .................................. 455/423 |
| 5,386,589 | * | 1/1995 | Kanai .................................. 455/423 |
| 5,570,373 | * | 10/1996 | Wing .................................. 455/423 |
| 5,623,484 | * | 4/1997 | Muszynski .................................. 455/423 |
| 5,706,333 | * | 1/1998 | Grenning et al. .................................. 455/67.1 |
| 5,757,810 | * | 5/1998 | Fall .................................. 714/704 |
| 5,832,387 | * | 11/1998 | Bae et al. .................................. 455/522 |
| 5,905,961 | * | 5/1999 | Sanders, III et al. .................................. 455/456 |
| 5,923,247 | * | 7/1999 | Dowden et al. .................................. 455/423 |
| 5,930,242 | * | 7/1999 | Mimura .................................. 370/331 |
| 6,018,659 | * | 1/2000 | Ayyagari et al. .................................. 455/431 |
| 6,055,429 | * | 4/2000 | Lynch .................................. 455/445 |

* cited by examiner

Primary Examiner—Daniel Hunter
Assistant Examiner—Yemame Woldetatios
(74) Attorney, Agent, or Firm—Dilworth & Barrese, LLP

(57) ABSTRACT

A method for controlling the transmitting power in a base station transceiver subsystem is provided. The method includes the steps of collecting and combining fault information from devices that provide factors affecting a call processing service, and determining the range of transceivers that should have blocked transmitting power based on the collected and combined fault information. The transmitting power of the determined range of transceivers is blocked by sending a message to a corresponding transceiver interface processor connected to each of a plurality of transceiver groups within the base station transceiver subsystem. The transmitting powers are normally transmitting by sending a message to the corresponding transceiver interface processor, when a fault ceases.

16 Claims, 7 Drawing Sheets

```
       cip23                                                          cip0
    ┌─────────────┬─────────────┬─────────────┐
    │bit7     bit0│bit7     bit0│bit7     bit0│
    └─────────────┴─────────────┴─────────────┘
   cip_agc_alm[α][2]  cip_agc_alm[α][1]  cip_agc_alm[α][0]

┌─────────────┬─────────────┬─────────────┐
    │bit7     bit0│bit7     bit0│bit7     bit0│
    └─────────────┴─────────────┴─────────────┘
   cip_agc_alm[β][2]  cip_agc_alm[β][1]  cip_agc_alm[β][0]

┌─────────────┬─────────────┬─────────────┐
    │bit7     bit0│bit7     bit0│bit7     bit0│
    └─────────────┴─────────────┴─────────────┘
   cip_agc_alm[γ][2]  cip_agc_alm[γ][1]  cip_agc_alm[γ][0]
```

FIG. 4

| destination address | | | |
|---|---|---|---|
| source address | | | |
| type | length | sig_id | |
| src_sub_id | | des_sub_id | |
| msg_id | | [0] [0] | [0] [1] |
| [0] [2] | [0] [3] | [0] [4] | [1] [0] |
| [1] [1] | [1] [2] | [1] [3] | [1] [4] |
| [2] [0] | [2] [1] | [2] [2] | [2] [3] |
| [2] [4] | [3] [0] | [3] [1] | [3] [2] |
| [3] [3] | [3] [4] | [4] [0] | [4] [1] |
| [4] [2] | [4] [3] | [4] [4] | [5] [0] |
| [5] [1] | [5] [2] | [5] [3] | [5] [4] |

XCVR id → [1] [1]
TIP id → [2] [0]
status → [5] [1]

FIG. 6

METHOD FOR CONTROLLING TRANSMITTING POWER IN BASE STATION TRANSCEIVER SUBSYSTEM

BACKGROUND OF THE INVENTION

1. Field of the Invention

The present invention relates to digital cellular systems and, more particularly, to a method for controlling the transmitting power in a base station transceiver subsystem.

2. Description of the Related Art

In a digital cellular system such as a CDMA (Code Division Multiple Access) system or a PCS (Personal Communication System), when a call processing service cannot be provided or such service is partially limited due to abnormal circumstances present in a base station transceiver subsystem, the normal transmission of a transmitting power results in interference with other normal systems. In such a circumstance, service quality as a whole is reduced.

SUMMARY OF THE INVENTION

It is an object of the present invention to provide a control method for blocking the normal transmitting power when a call processing service cannot be provided or such service is partially limited due to abnormal circumstances present in a base station transceiver subsystem It is another object of the present invention to provide a method for controlling the transmitting power in accordance with present operating conditions in a base station transceiver subsystem.

According to one feature of the present invention, a method for controlling the transmitting power in a base station transceiver subsystem includes the steps of collecting and combining fault information from devices that provide factors affecting a call processing service, and determining the range of transceivers that should have blocked transmitting power based on the collected and combined fault information. The transmitting power of the determined range of transceivers is blocked by sending a message to a corresponding transceiver interface processor connected to each of a plurality of transceiver groups within the base station transceiver subsystem. The transmitting powers are normally transmitting by sending a message to the corresponding transceiver interface processor, when a fault ceases.

BRIEF DESCRIPTION OF THE DRAWINGS

The above objects and advantages of the present invention will be more apparent from the detailed description of the present invention, taken in conjunction with the accompanying drawings, in which:

FIG. 4 illustrates a buffer structure for storing the state of an automatic gain controller (AGC);

FIG. 6 illustrates a message structure for transmitting a transmission power mode to a transceiver interface processor (TIP)

DETAILED DESCRIPTION OF THE PREFERRED EMBODIMENT

In the following description, numerous specific details, such as the number of respective elements, buffer maps, etc., are set forth to provide a more thorough understanding of the present invention. It will be apparent, however, to one skilled in the art that the present invention may be practiced without these specific details.

Figure 1:
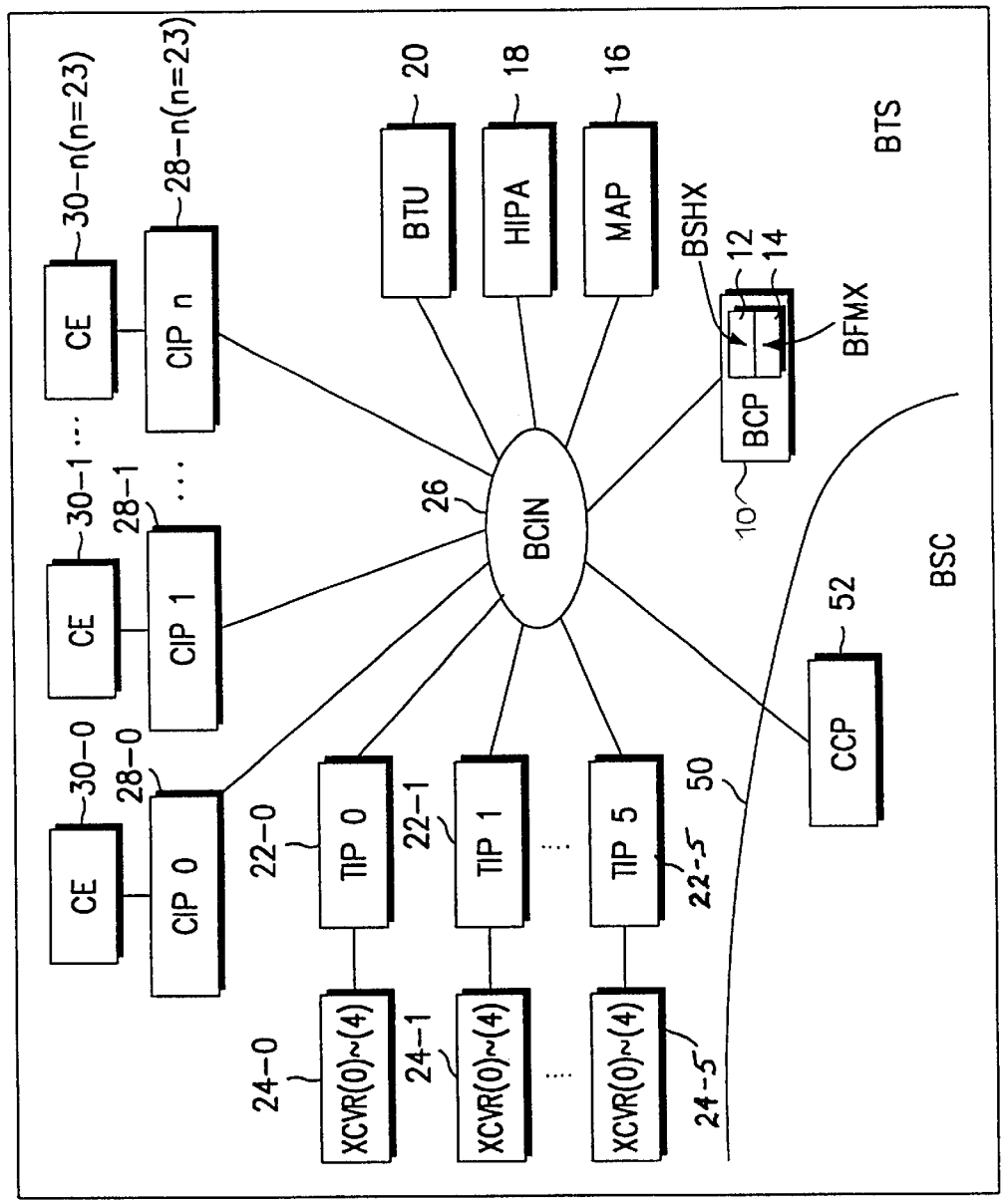
FIG. 1 is a block diagram of a base station transceiver subsystem (BTS) of a digital cellular system, to which an embodiment of the present invention is applied.

FIG. 1 is a block diagram of a base station transceiver subsystem (BTS) of a PCS or CDMA system. A BTS status handing executor (BSHX) 12 within a BTS control processor (BCP) 10 manages the state of the devices which comprise the BTS. A BTS fault management executor (BFMX) within BCP 10 manages the faults of the BTS. A BTS test unit (BTU) 20 tests the BTS. Channel element interface processors (CIPs) 28-0 through 28-n monitor channel elements (CEs) 30-0 through 30-n, digitally combine signals generated from channel elements 30-0 through 30-n, and convert the combined digital samples into analog signals. In an illustrative embodiment of the present invention, n=23 for both the CIPs and the CEs. A high speed interconnect processor assembly (HIPA) 18 is a communication network manager for managing a network of the BTS and maintaining a high capacity IPC node board assembly (HINA).

In the illustrative embodiment of FIG. 1, six (6) transceiver interface processors (TIPs) 22-0 through 22-5 receive data from BCP 10 for generating a radio frequency (RF) in each of transceivers (XCVRs) 24-0 through 24-5, respectively, and transmit the received data to the transceivers 24-0 through 24-5. Moreover, TIPs 22-0 through 22-5 transmit state information received from the respective transceivers 24-0 through 24-5 to BCP 10. The 6 transceivers 24-0 through 24-5 receive information from TIPs 22-0 through 22-5, respectively, in order to adjust transceiver frequency and output, detect alarm information and report a status, and display the status through a display unit. According to the illustrative embodiment, transceivers 24-0 through 24-5 each have 5 transceivers XCVR(0) through XCVR(4) therein. Therefore, a total of 30 transceivers are utilized in the illustrative embodiment.

A BTS communication interconnect network (BCIN) 26 transmits packet data between internal devices of the BTS, and between the BTS and a base station controller (BSC) 50, providing a path therebetween. According to the illustrative embodiment, a trunk having a maximum of 16 links is provided between the BTS and a call control processor (CCP) 52 of the BSC 50.

Figure 2:
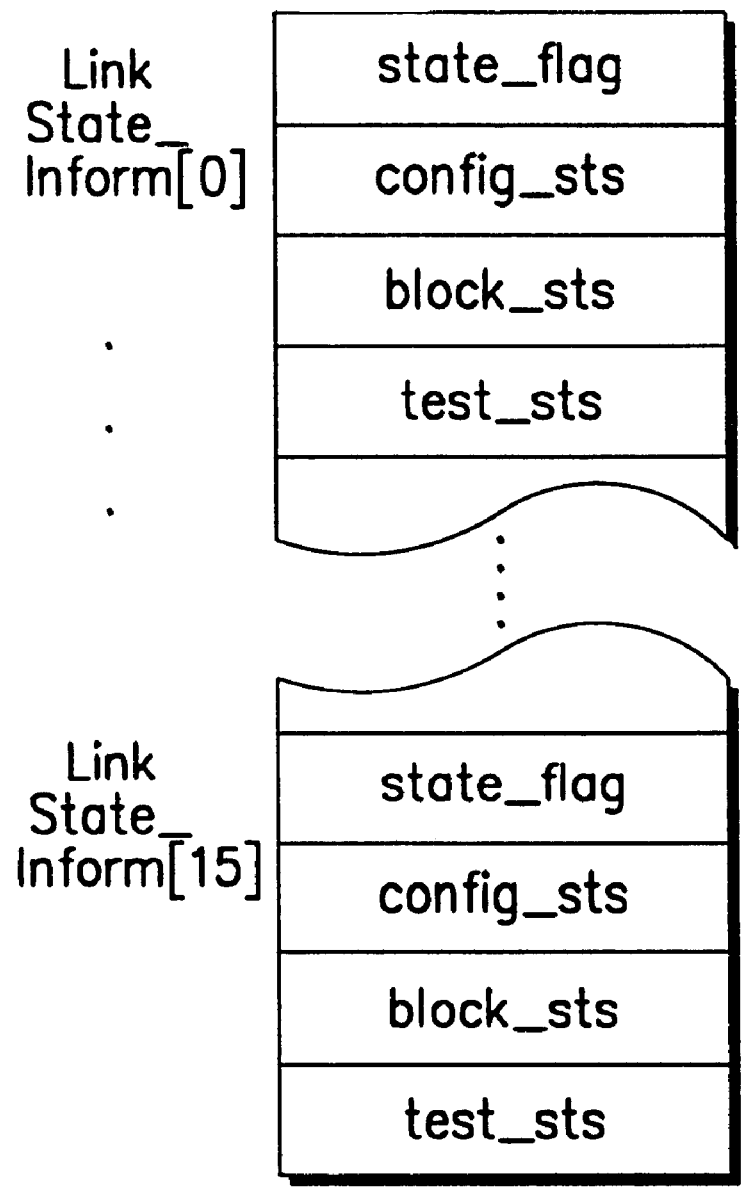
FIG. 2 illustrates a buffer structure for storing the state of a trunk between a base station controller (BSC) and a base station transceiver subsystem (BTS)
Figure 3:
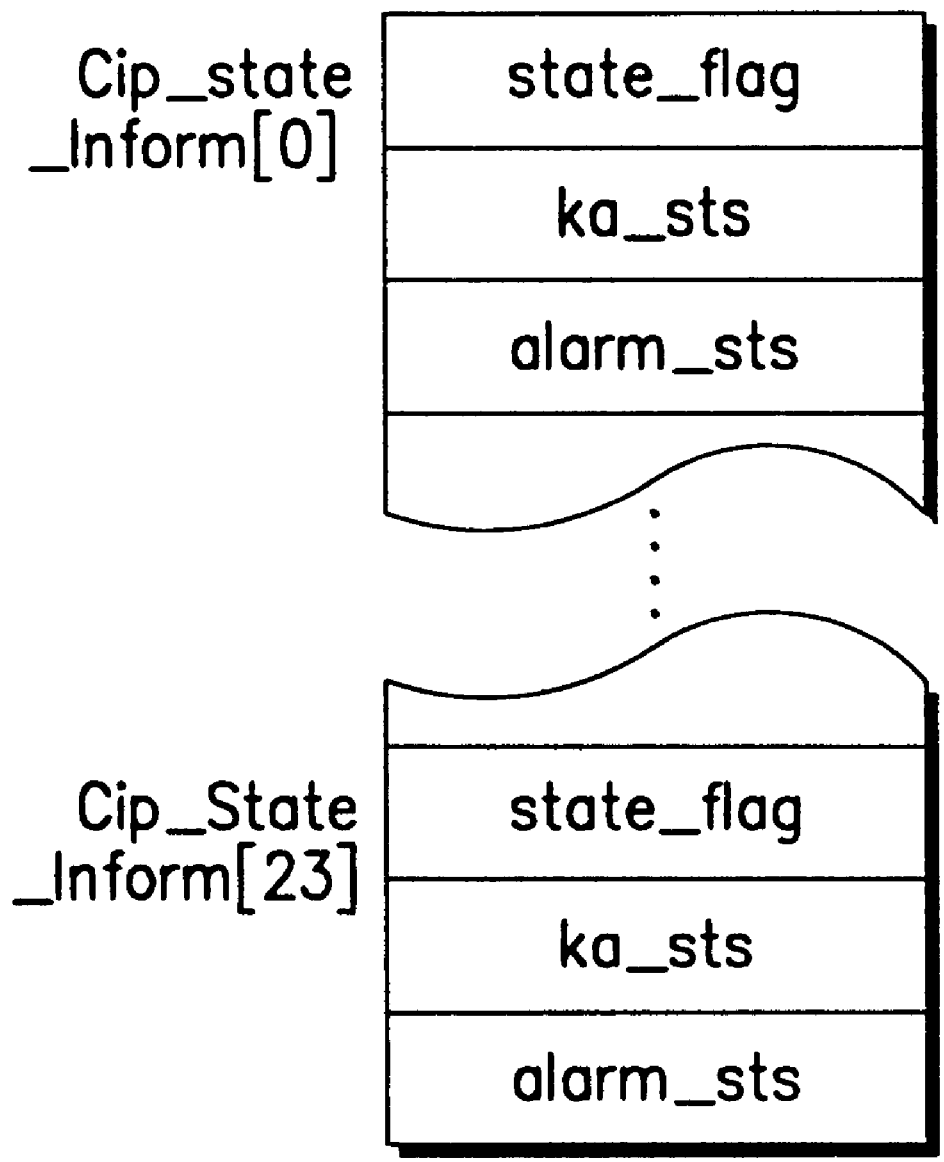
FIG. 3 illustrates a buffer structure for storing the state of a channel element interface processor (CIP)
Figure 5:
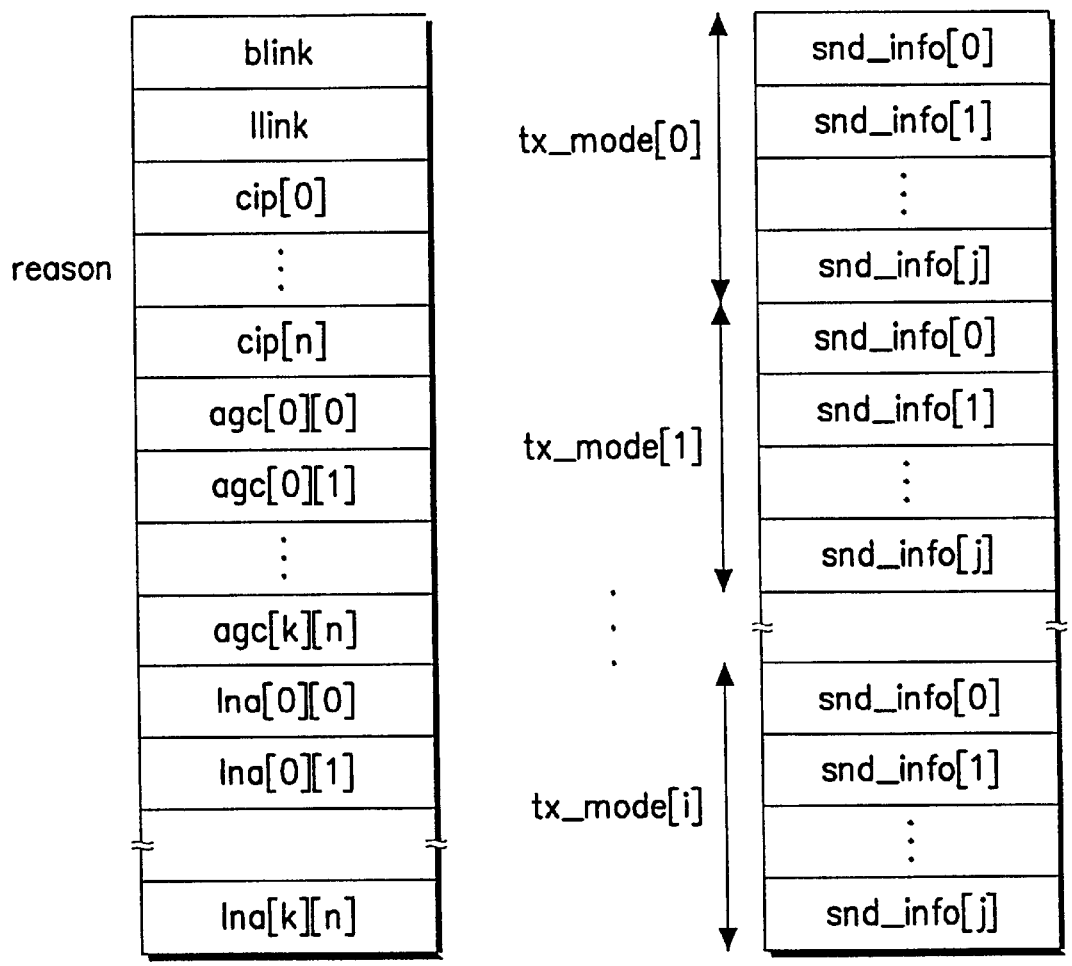
FIG. 5 illustrates a buffer structure for storing a transmission power mode.

FIG. 2 illustrates a buffer structure for storing the state of the trunk between the BTS and the BSC 50. FIG. 3 illustrates a buffer structure for storing the state of a CIP. FIG. 4 illustrates a buffer structure for storing the state of an automatic gain controller (AGC). FIG. 5 illustrates a buffer structure for storing a transmission power mode. The buffers illustrated in FIGS. 2 through 5 are contained in BCP 10 of the BTS.

Referring to FIG. 2, the buffer has 16 regions designated "Link State_Inform[0]" through "Link State Inform[15]" for storing state information of the 16 links of the trunk. Each region includes a state flag field 'state_flag', a configuration status field 'config_sts', a block status field 'block-sts', and a test status field 'test_sts'. If information in any one of the fields 'config_sts', 'block_sts', and 'test_sts' is abnormal, then abnormal state flag information is stored in the 'state_flag' field. If the information is all normal, then normal state flag information is stored in the 'state_flag' field. The status of a link monitored from the HIPA 18 is stored in the 'config_sts' field. Link blocking information caused by man-machine communication (MMC) is stored in the 'block_sts' field. The state of a link tested from the CCP 52 of the BSC 50 is stored in the 'test_sts' field.

The buffer indicated in FIG. 3 has 24 regions designated "Cip_State_Inform[0]" through "Cip_State_Inform[23]" for storing the state information of the 24 CIPs. Each region includes a state flag field 'state_flag', a keep-alive status field 'ka_sts', and an alarm status field 'alarm_sts'. If information in any one of the fields 'ka_sts' and 'alarm_sts' is abnormal, then abnormal state information is stored in the 'state_flag' field. If the information is all normal, then normal state information is stored in the 'state_flag' field. Information of a keep-alive status is stored in the 'ka_sts' field. The keep-alive status represents that BCP 10 periodically transmits a message to a corresponding CIP and the corresponding CIP responds thereto. Information indicating whether or not a fault is generated in a CIP is stored in the 'alarm_sts' field.

The buffer shown in FIG. 4 stores state information of an automatic gain controller (AGC) that is situated at a connection path from a transceiver to a CIP. The state of the AGC is sensed by each CIP. The buffer is divided according to sectors $\alpha$, $\beta$ and $\gamma$. One cell has the sectors $\alpha$, $\beta$ and $\gamma$. Each sector consists of 3 bytes (i.e., 24 bits). This buffer structure is indicated as cip_agc_alm[x][y] (where x is a sector $\alpha$, $\beta$ or $\gamma$, and y is 0, 1 or 2). The state information of the AGC sensed by the 24 CIPs is stored in each of the 24 bits. For example, in bit7 of the third byte of the sector $\alpha$, the state information of the AGC sensed by the 24-th CIP (i.e., CIP 23) is stored.

Referring to FIG. 5, a "reason" region of the buffer, shown on the left side of FIG. 5, has fields 'blink', 'llink', 'cip[0]' through 'cip[n]', 'agc[0][0]' through 'agc[k][n]', and 'lna[0][0]' through 'lna[k][n]'. The parameter k is obtained by subtracting 1 from the maximum number of sectors per BTS (the maximum number of sectors equals 3, corresponding to sectors $\alpha$, $\beta$ or $\gamma$). The parameter n is obtained by subtracting 1 from the maximum number of CDMA channels (i.e., 8, as explained hereinbelow). One CDMA channel corresponds to one frequency allocator (FA). Since 3 CIPs are assigned by one FA, the 24 CIPs of the present invention are assigned by 8 FAs. Therefore, the maximum number of CDMA channels is 8. Information indicating whether or not there is a normal link among the 16 links, on the basis of the information stored in the buffer of FIG. 2, is stored in the 'blink' field of the "reason" region. For example, if at least one link is normal, then normal state information is stored in the 'blink' field. If there are no normal links, then abnormal state information is stored in the 'blink' field. Information indicating whether or not it is possible to communicate through the 16 links of the trunk between BCP 10 and CCP 52 is stored in the 'llink' field. Information representing whether or not there is a normal CIP out of the 3 CIPs assigned by one FA is stored in the fields 'cip[0]' through 'cip[n]'. The state information of the AGC is stored in the fields 'agc[0][0]' through 'agc[k][n]' according to each sector and each FA. State information of a low noise amplifier (LNA) is stored in the fields 'lna[0][0]' through 'lna[k][n]' according to each sector and each FA.

The buffer at the right side of FIG. 5 has (i+1) transmitting mode regions designated "tx_mode[0]" through "tx_mode[i]". The parameter i is obtained by subtracting 1 from the maximum number of TIPs per BTS (i.e., 6). Therefore, there are 6 transmitting mode regions "tx_mode[0]" through "tx_mode[5]". Each transmitting mode region has transmitting information fields 'snd_info[0]' through 'snd_info[j]' in which transmitting power control information is stored. The transmitting power control information stored in the transmitting information fields 'snd_info[0]' through 'snd_info[j]' is based on the buffer of the left side. The parameter j is obtained by subtracting 1 from the maximum number of transceivers within a transceiver per BTS (i.e., 5, corresponding to XCVR(0) through XCVR(4)). Therefore, each of the transmitting mode regions "tx_mode[0]" through "tx_mod[5]" has 5 fields 'snd_info[0]' through 'snd_info[4]'.

FIG. 6 illustrates a message structure for transmitting a transmitting power mode to a TIP. A destination address of the TIP is stored in a "destination address" region. A source address of the BCP is stored in a "source address" region. Information indicating whether a message is a control type or a traffic type message is stored in a "type" region. The message size is stored in a "length" region. An identification (ID) of a current signal is stored in a current signal ID region "sig_id". A sub ID of a source for discriminating processors within the source is stored in a source sub ID region "src_sub id". A sub ID of a destination for discriminting processors of the destination is stored in a destination sub ID region "des_sub_id" which has nothing to do with the transmitting power control of the present invention. The type of a plurality of message IDs of the current signal stored in the current signal ID region is stored in a message ID region "msg_ID". The state of a TIP and transceiver is stored in status regions "status[0][0]" through "status[5][4]". In a status region "status[x][y]", x indicates a TIP ID, and y indicates a transceiver ID (i.e., transceivers XCVR(0) through XCVR(4)) corresponding to the TIP. Thus, the designations x and y have values associated therewith from 0–5 and 0–4, respectively. For example, in the status region "status[0][0]", the transmitting power control information at the first transceiver XCVR(0) within transceiver 24-0 corresponding to first TIP 22-0 is updated.

Figure 7:
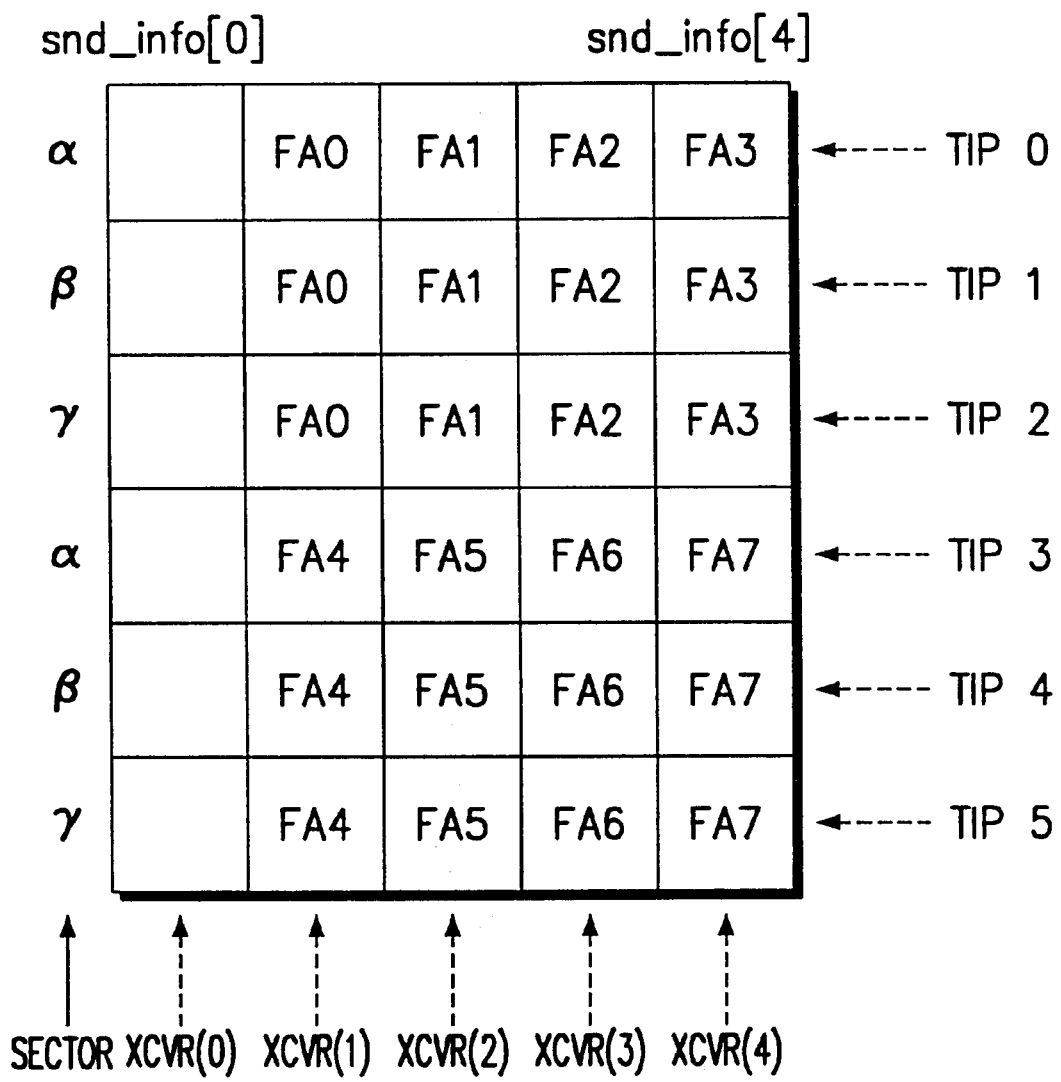
FIG. 7 illustrates the relationship between transmission power control information, sectors, and frequency allocators (FAs).

FIG. 7 illustrates the relationship between the transmitting power control information, the sectors and the FAs. Referring to FIGS. 1 and 7, TIPs 22-0, 22-1, and 22-2 (i.e., TIP 0, TIP 1 and TIP 2) correspond to sectors $\alpha$, $\beta$ and $\gamma$, respectively. The TIPs 22-3, 22-4 and 22-5 (i.e., TIP 3, TIP 4 and TIP 5) also correspond to sectors $\alpha$, $\beta$ and $\gamma$, respectively. The same FA is assigned to transceivers of the same order within the transceivers 24-0, 24-1 and 24-2 or 24-3, 24-4 and 24-5 corresponding to three TIPs 22-0, 22-1 and 22-2 (TIP 0, TIP 1 and TIP 2) or 22-3, 22-4 and 22-5 (TIP 3, TIP 4 and TIP 5), respectively. For example, second transceivers XCVR(1) within transceivers 24-0, 24-1 and 24-2 corresponding to TIPs 22-0, 22-1 and 22-2 (TIP 0, TIP 1 and TIP 2), respectively, use the same FA, namely first FA FA0. As another example, the last transceivers XCVR(4) within transceivers 24-3, 24-4 and 24-5 corresponding to TIPs 22-3, 22-4 and 22-4 (TIP 3, TIP 4 and TIP 5), respectively, use the same FA, namely FA7. The transmitting power control information fields 'snd_info[0]' through 'snd_info[4]' correspond to transceivers XCVR(0) through XCVR(4) within transceivers 24-0 through 24-5. Since the transceivers XCVR(0) within transceivers 24-0 through 24-5 are backup transceivers, an FA is not assigned to the transmitting power control information field 'snd_info[0]' corresponding to the transceivers XCVR(0).

An operation according to a preferred embodiment of the present invention will be described hereinbelow in detail with reference to FIGS. 1 to 7. However, before such a description is provided, some of the factors affecting the transmitting power of transceivers 24-0 through 24-5 are noted. Such factors include, for example, the state of the trunk (that is, the 16 links) between the BSC and the BTS, the state of the 24 CIPs, the state of the AGC, the state of the LNA alarm, etc. Judgements regarding whether or not to block the transmitting power, and the range of transceivers that will have their transmitting power blocked are described hereinbelow.

First, the following information is applied to BSHX 12 of BCP 10: information which indicates the state of the trunk between BSC 50 and the BTS and which is reported from HIPA 18 to BSHX 12; information reported by communication with the BCP 10 from the CCP 52 within BSC 50 or by a self link test; or information which is not utilized by the user. The BSHX 12 stores the received information in the 'config_sts', 'test_sts' and 'block_sts' fields of a corresponding link state information region "Link_State_Inform [x]" (where x is a value from 0–15) shown in FIG. 2. BSHX 12 then updates the state information of the links in the 'state_flag' field of the corresponding link state information region "Link_State_Inform[x]" by the combination of the information stored in the 'config_sts', 'test_sts' and 'block_sts' fields. If information stored in any one of the 'config_sts', 'test_sts' and 'block_sts' fields is abnormal, then abnormal state information is updated in the 'state_flag' field. If the information is all normal, then normal state information is updated in the 'state_flag' field.

Therefore, BSHX 12 can judge whether or not the state of a corresponding link has changed by the state flag information updated in the 'state_flag' field.

If the state of any link within the trunk is changed from a normal state to an abnormal state, BSHX 12 judges whether or not the state of the other links are all abnormal by sequentially checking the state flag information in the 'state_flag' field of the link state information region "Link_State_inform[x]". If any one link is normal (i.e., at least one), then the call processing service can be normally performed, and the normal state information is stored in the 'blink' field. If all the links of the trunk are abnormal, then the abnormal state information is stored in the 'blink' field shown in FIG. 5. The BSHX 12 compares a current information value with a previous information value. If they are the same, there is no further processing. However, if they are different from each other, for example, if the value stored in the 'blink' field is changed from the normal state to the abnormal state, BSHX 12 updates the abnormal state information in all the fields 'snd_info[0]' through 'snd_info[j]' of the transmission mode regions "tx_mode[0]" through "tx_mode[i]" shown in FIG. 5.

The BSHX 12 also copies the abnormal state information stored in fields 'snd_info[0]' through 'snd_info[j]' of each of the transmission mode regions "tx_mode[0]" "tx_mode [i]" to the status regions "status[0][0]" through "status[i][j]" of the message for transmitting a transmitting power mode to the TIPs (see FIG. 6). The copied message is transmitted to TIPs 22-0 through 22-5. If the trunk is abnormal, since the BTS cannot process a call, such a message for blocking the transmitting power of all the transceivers within the BTS is transmitted to TIPs 22-0 through 22-5. In FIG. 5, since the transmitting power control information stored in the field 'snd_info[0]' indicates information corresponding to a backup transceiver, only the transmitting power control information stored in fields 'snd_info[1]' through 'snd_info[4]' (i.e., excluding field 'snd_info[0]') contain effective information. If the transmitting power control information stored in fields 'snd_info[0]' through 'snd_info[4]' indicate normal information, this represents that the transmitting power of the transceivers should be normally generated. If the information is abnormal, this represents that the transmitting power of the transceivers should be blocked.

During the periodic transmitting and receiving of an answer-back message between BCP 10 and CCP 52, as well as externally reported information, if there is no answer for a predetermined period of time from the CCP 52 (e.g., 12 seconds), BSHX 12 regards this state as an abnormal communication state. Hence, the abnormal state information is updated in the field 'llink' illustrated in FIG. 5. Thereafter, the abnormal state information is stored in fields 'snd_info [0]' through 'snd_info[j]' of each of the transmission mode regions "tx_mode[0]" through "tx_mode[i]". The abnormal state information is copied to the status regions of the message of FIG. 6. The copied message is transmitted to TIPs 22-0 through 22-5.

If the communication is re-started, BSHX 12 updates the normal state information in the 'llink' field shown in FIG. 5 and stores the normal state information in fields 'snd_info [0]' through 'snd_info[j]' of transmission mode regions "tx_mode[0]" through "tx_mode[i]". The normal state information is copied to the status regions of the message of FIG. 6. The copied message is transmitted to TIPs 22-0 through 22-5.

Second, BSHX 12 checks whether the 24 CIPs 28-0 through 28-n are in the keep-alive state through the periodic (for example, 3 seconds) answer-back message. If the state of any CIP has changed, BSHX 12 stores the abnormal or normal state information in the 'ka_sts' field of the corresponding CIP state information region shown in FIG. 3. Meanwhile, BFMX 14 within BCP 10 can indicate whether or not a fault is generated in the CIP. In this case, BSHX 12 stores "'ALM_ON(1)'" or "'ALM_OFF(0)'" in the 'alarm_sts' field. The BSHX 12 determines the state of the 'state_flag' field by combining the state of the 'ka_sts' field with the state of the 'alarm_sts' field. If the state of the 'state_flag' field has changed, BSHX 12 confirms whether or not all the CIPs within the FA are normal by checking the state of the 'state_flag' field. If all the CIPs within the FA are abnormal, the abnormal state information is stored in a corresponding one of the fields 'cip[0]' through 'cip[n]' shown in FIG. 5. The abnormal state information is also stored in a corresponding one of the fields 'snd info[0]' through 'snd_info[j]'. As illustrated in FIG. 7, 4 FAs per sector are assigned to each TIP. If the corresponding FAs are FA0, FA1, FA2 and FA3, BSHX 12 sends a blocking message to TIPs 22-0, 22-1 and 22-2 (TIP 0, TIP 1 and TIP 2). If the corresponding FAs are FA4, FA5, FA6 and FA7, BSHX 12 sends the blocking message to TIPs 22-3, 22-4 and 22-5 (TIP 3, TIP 4 and TIP 5).

Third, the state of the AGC is reported from CIPs 28-1 through 28-n. Each CIP has a path according to sectors α, β and γ. Therefore, BSHX 12 stores the state of the AGC in each bit shown in FIG. 4 according to the ID of the CIP. If the state of the AGC is changed from the normal state to the abnormal state, BSHX 12 updates the abnormal state information in the corresponding field 'agc[sector][fa]' illustrated in FIG. 5. The abnormal state information is also updated in the corresponding field among fields 'snd_info[0]' through 'snd_info[j]'. Thereafter, BSHX 12 sends the blocking message only to the TIP in which the transceiver assigned to a corresponding subcell is contained.

Fourth, since the LAN receives information regarding an alarm state, a corresponding sector and a respective FA from BFMX 14, BSHX 12 updates the normal or abnormal state information in the corresponding field 'lna[sector][fa]' and in the corresponding field among fields 'snd_info[0]' through 'snd_info[j]' indicated in FIG. 5. Thereafter, BSHX 12 sends the blocking message only to the TIP in which the transceiver assigned to a corresponding subcell is contained.

A method for updating the information in fields 'snd_info[0]' through 'snd_info[j]' illustrated in FIG. 5 is described hereinafter. If any factor among the above-described factors affecting the transmitting power of transceivers 24-0 through 24-5 is generated, and results in information stored in a corresponding field of the reason region, BSHX 12 checks the field 'blink' or 'llink'. If one of the two fields is abnormal, the transmitting power control information stored in fields 'snd_info[0]' through 'snd_info[j]' are all abnormal since it is impossible to provide the call processing service. If the trunk is normal, that is, if normal state information is stored in 'blink' and 'llink' fields, BSHX 12 checks fields 'cip[0]' through 'cip[n]'. If the abnormal state information is stored in any one of fields 'cip[0]' through 'cip[n]', then the abnormal state information is updated in the field corresponding to the respective FA of all the sectors among fields 'snd_info[0]' through 'snd_info[j]'. The normal or abnormal state information is updated in the corresponding field among fields 'snd_info[0]' through 'snd_info[j]' according to the respective sector and FA.

As noted above, if a factor (corresponding to a fault) is generated from the devices which may affect call service, the range of influence of the corresponding device (i.e., the range of influence of the fault) is determined and a message for blocking transmitting power is sent to the respective TIP(s). If normal service is possible, a message for normally transmitting the transmitting power is sent to the respective TIP(s). Through such processes, abnormal circumstances affecting the determined range will not effect existing service. Further, even if a specific BTS does not provide the call processing service due to a fault, an adjacent BTS can process the call.

That is, if the BTS cannot perform the call processing service normally, the transmitting power of the BTS is blocked. If the factor affecting the call processing service has ceased, then the transmitting power of the BTS is restored. Therefore, there is no interference with other normal systems and call service quality is improved.

While the invention has been shown and described with reference to certain illustrative embodiments thereof, it will be understood by those skilled in the art that various changes in form and details may be made therein without departing from the spirit and scope of the invention as defined by the appended claims.

What is claimed is:

1. A method for controlling a transmitting power in a base station transceiver subsystem, comprising the steps of:
   processing fault information pertaining to factors affecting a call service and updating a first buffer accordingly;
   checking the first buffer to determine if the call service is possible and updating a second buffer accordingly;
   determining which transceivers out of a plurality of transceiver groups should have blocked transmitting power based on the updated second buffer;
   blocking the transmitting power of the determined transceivers; and
   restoring the transmitting power, when a fault ceases.

2. The method of claim 1, wherein the blocking step blocks the transmitting power of the determined range of transceivers by sending a message to corresponding transceiver interface processor connected to each of a plurality of transceiver groups within the base station transceiver subsystem.

3. The method of claim 2, wherein the restoring step restores the transmitting power when a fault is solved by sending a message to the corresponding transceiver interface processor.

4. The method of claim 1, wherein the factors affecting the call processing service are selected from the group consisting of when a trunk between the base station transceiver subsystem and a base station controller is abnormal, when all channel element interface processors within a frequency allocator are abnormal, when an automatic gain controller within a subcell is abnormal, and when a low noise amplifier within the subcell is abnormal.

5. The method of claim 1, wherein the transmitting powers of all the transceivers are blocked, when all links of a trunk between the base station transceiver subsystem and a base station controller are abnormal.

6. The method of claim 1, wherein the transmitting powers of all the transceivers corresponding to a frequency allocator in which channel element interface processors are contained are blocked, when the channel element interface processors within a frequency allocator are abnormal.

7. The method of claim 1, wherein the transmitting powers of all the transceivers corresponding to a subcell in which an automatic gain controller is contained are blocked, when the automatic gain controller within the subcell is abnormal.

8. The method of claim 1, wherein the transmitting powers of all the transceivers corresponding to a subcell in which a low noise amplifier is contained are blocked, when the low noise amplifier within the subcell is abnormal.

9. A method for controlling a transmitting power in a base station transceiver subsystem, comprising the steps of:
   collecting and combining fault information from devices that provide factors affecting a call processing service and updating a first buffer and using the updated first buffer to update at least a second buffer;
   determining the range of transceivers that should have blocked transmitting power based on the collected and combined fault information by referring to at least the updated second buffer;
   blocking the transmitting power of the determined range of transceivers; and
   restoring the transmitting power, when a fault is solved.

10. The method of claim 9, wherein the blocking step blocks the transmitting power of the determined range of transceivers by sending a message to corresponding transceiver interface processor connected to each of a plurality of transceiver groups within the base station transceiver subsystem.

11. The method of claim 9, wherein the restoring step restores the transmitting power when a fault is solved by sending a message to the corresponding transceiver interface processor.

12. The method of claim 9, wherein the factors affecting the call processing service are selected from the group consisting of when a trunk between the base station transceiver subsystem and a base station controller is abnormal, when all channel element interface processors within a frequency allocator are abnormal, when an automatic gain controller within a subcell is abnormal, and when a low noise amplifier within the subcell is abnormal.

13. The method of claim 9, wherein the transmitting powers of all the transceivers are blocked, when all links of a trunk between the base station transceiver subsystem and a base station controller are abnormal.

14. The method of claim 9, wherein the transmitting powers of all the transceivers corresponding to a frequency allocator in which channel element interface processors are contained are blocked, when the channel element interface processors within a frequency allocator are abnormal.

15. The method of claim 9, wherein the transmitting powers of all the transceivers corresponding to a subcell in which an automatic gain controller is contained are blocked, when the automatic gain controller within the subcell is abnormal.

16. The method of claim 9, wherein the transmitting powers of all the transceivers corresponding to a subcell in which a low noise amplifier is contained are blocked, when the low noise amplifier within the subcell is abnormal.

\* \* \* \* \*